United States Patent
Chen et al.

(10) Patent No.: US 12,436,654 B1
(45) Date of Patent: Oct. 7, 2025

(54) TOUCH PANEL

(71) Applicant: HENGHAO TECHNOLOGY CO., LTD., Hsin-chu County (TW)

(72) Inventors: Yu-Tung Chen, Hsinchu County (TW); Chun-Jung Chen, Taoyuan (TW); Ching-Wei Hsu, Taoyuan (TW)

(73) Assignee: HENGHAO TECHNOLOGY CO., LTD., Hsin-chu County (TW)

( * ) Notice: Subject to any disclaimer, the term of this patent is extended or adjusted under 35 U.S.C. 154(b) by 0 days.

(21) Appl. No.: 18/946,946

(22) Filed: Nov. 14, 2024

(30) Foreign Application Priority Data

Jul. 18, 2024 (TW) ................................ 113126910

(51) Int. Cl.
*G06F 3/041* (2006.01)
*G06F 3/044* (2006.01)

(52) U.S. Cl.
CPC .......... *G06F 3/0446* (2019.05); *G06F 3/0445* (2019.05); *G06F 2203/04112* (2013.01)

(58) Field of Classification Search
CPC ................. G06F 3/0446; G06F 3/0445; G06F 2203/04112
See application file for complete search history.

(56) References Cited

U.S. PATENT DOCUMENTS

| 2020/0125202 | A1 | 4/2020 | Li |
| 2021/0208735 | A1* | 7/2021 | Xie ...................... G06F 3/0446 |
| 2022/0308694 | A1 | 9/2022 | Tong |
| 2022/0334678 | A1* | 10/2022 | Long .................... G06F 3/0443 |
| 2023/0315237 | A1 | 10/2023 | Xie |

FOREIGN PATENT DOCUMENTS

| CN | 114003143 | 2/2022 |
| CN | 114237411 | 3/2022 |
| TW | I614651 | 2/2018 |
| TW | I660295 | 5/2019 |
| TW | I835629 | 3/2024 |

* cited by examiner

*Primary Examiner* — Deeprose Subedi
(74) *Attorney, Agent, or Firm* — Winston Hsu

(57) ABSTRACT

A touch panel is provided and includes a substrate, a first metal layer, and a second metal layer. The first metal layer is disposed on the substrate and includes a plurality of first polygonal grids. In each of the first polygonal grids, a length in a first direction is greater than a width in a second direction. The second metal layer is disposed on the substrate and includes a plurality of second polygonal grids. In each of the second polygonal grids, a length in the second direction is greater than a width in the first direction.

14 Claims, 10 Drawing Sheets

ID: 12,436,654 B1

TOUCH PANEL

BACKGROUND OF THE INVENTION

1. Field of the Invention

The present invention relates to a touch panel and particularly to a touch panel including mesh electrodes.

2. Description of the Prior Art

Recently, in order to reduce production costs and resistance, touch panels using metal meshes as sensing electrodes have been developed. Common metal mesh electrodes are formed by periodic rhombus-shaped grids. However, sensing electrodes formed of the rhombus-shaped grids and extending along different directions still have obvious resistance difference. Since the touch panel is extremely sensitive to resistive and capacitive loadings of the sensing electrodes extending along different directions, the resistance difference between the sensing electrodes easily affect touch sensitivity of the touch panel or cause a computational burden on the touch panel.

SUMMARY OF THE INVENTION

It is one of the objectives of the present invention to provide a touch panel to reduce resistance difference between electrodes extending along different directions.

According to an embodiment of the present invention, a touch panel is provided and includes a substrate, a first metal layer, and a second metal layer. The first metal layer is disposed on the substrate, and the first metal layer includes a plurality of first mesh electrodes respectively extending along a first direction, wherein each of the first mesh electrodes includes a plurality of first polygonal grids tiled to each other, and each of the first mesh electrodes has a mesh pattern. Each of the first polygonal grids has a first length in the first direction and a first width in a second direction different from the first direction, and the first length is greater than the first width. The second metal layer is disposed on the substrate and electrically insulated from the first metal layer, and the second metal layer includes a plurality of second mesh electrodes respectively extending along the second direction, wherein the first mesh electrodes cross the second mesh electrodes in a top view of the touch panel, each of the second mesh electrodes includes a plurality of second polygonal grids tiled to each other, and each of the second mesh electrodes has another mesh pattern. Each of the second polygonal grids has a second length in the second direction and a second width in the first direction, and the second length is greater than the second width.

According to another embodiment of the present invention, a touch panel is provided and includes a substrate, a first metal layer, and a second metal layer. The substrate has a plurality of first virtual regions and a plurality of second virtual regions, wherein the first virtual regions and the second virtual regions are arranged in an array and separated from each other, and the first virtual regions and the second virtual regions are arranged in a staggered formation. The first metal layer is disposed on the substrate, and the first metal layer includes a plurality of first mesh electrodes respectively extending along a first direction. Each of the first mesh electrodes includes a plurality of first grid lines and a plurality of first grid points, and the first grid lines are connected by the first grid points to form a plurality of first quadrilateral grids, so that each of the first mesh electrodes has an irregular mesh pattern. In a top view of the touch panel, each of the first grid points is disposed in a corresponding one of the first virtual regions. The second metal layer is disposed on the substrate and electrically insulated from the first metal layer, and the second metal layer includes a plurality of second electrodes respectively extending along a second direction. The first mesh electrodes cross the second mesh electrodes in a top view of the touch panel. Each of the second mesh electrodes includes a plurality of second grid lines and a plurality of second grid points, and the second grid lines are connected by the second grid points to form a plurality of second quadrilateral grids, so that each of the second mesh electrode has another irregular mesh pattern. In the top view of the touch panel, each of the second grid points is disposed in a corresponding one of the second virtual regions.

In the touch panel of the present invention, since one of the second polygonal grids surrounds one of the first short sides in the top view, and one of the first polygonal grids surrounds one of the second short sides of another of the second polygonal grids in the top view, the length of the first polygonal grid in the first direction may be greater than the width of the first polygonal grid in the second direction, and the length of the second polygonal grid in the second direction may be greater than the width of the second polygonal grid in the first direction, which helps to uniformize the resistances of the first mesh electrodes in the first direction and the resistances of the second mesh electrodes in the second direction, thereby reducing the computational burden of the touch panel and/or improving the touch sensitivity of the touch panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
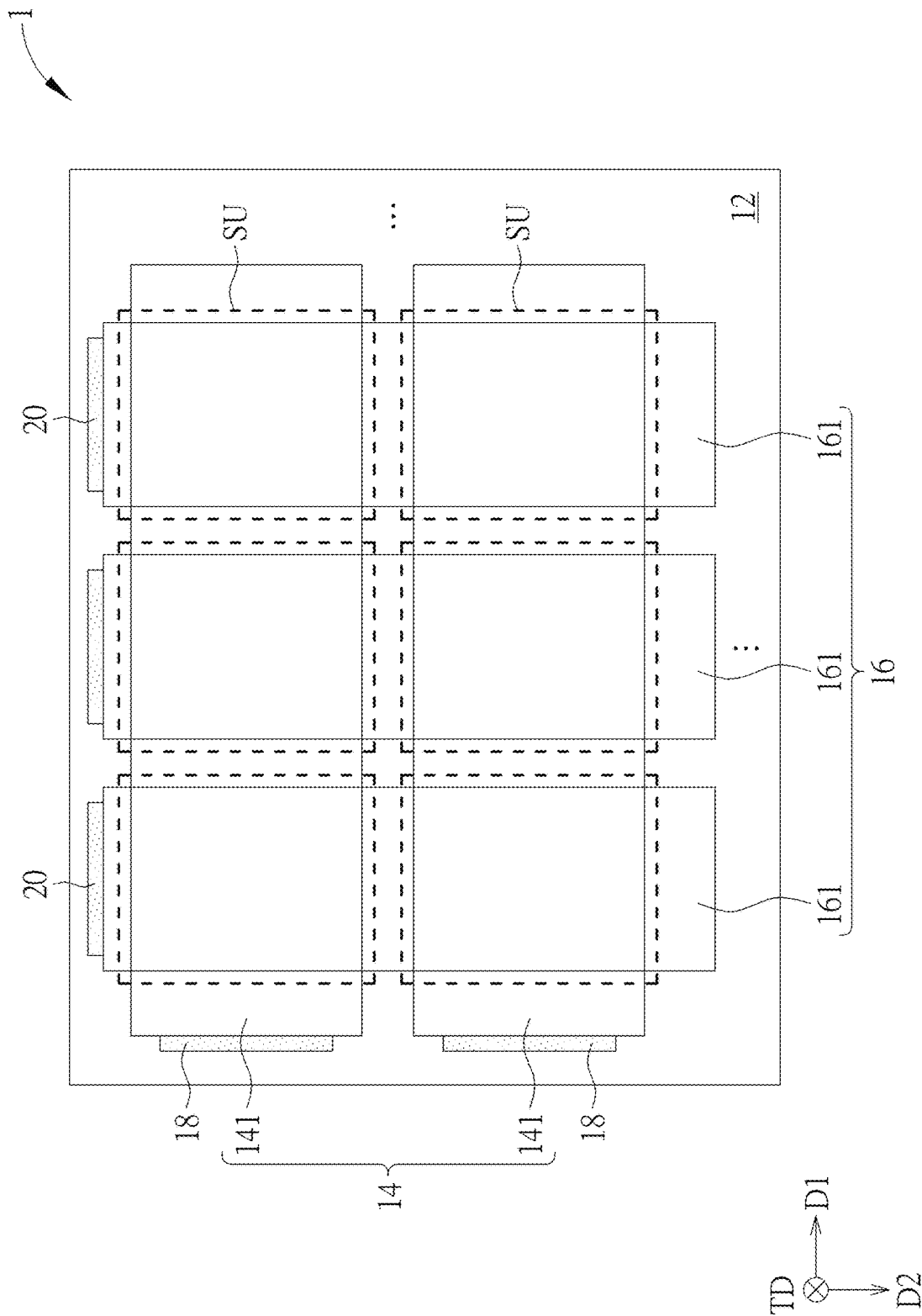
FIG. 1 illustrates a top view of a touch panel according to an embodiment of the present invention.

The present invention will be described in detail below in combination with embodiments and drawings. In order to make the present invention clear and easy to understand, the drawings below may be simplified schematic diagrams and the components thereof may not be drawn to actual scale. Moreover, the number and size of each component in the drawings are merely for illustration and are not intended to limit the scope of the present invention.

Refer to FIG. 1, which illustrates a top view of a touch panel according to an embodiment of the present invention. As shown in FIG. 1, the touch panel 1 provided in this embodiment includes a substrate 12, a first metal layer 14, and a second metal layer 16, in which the first metal layer 14 and the second metal layer 16 are disposed on the substrate 12, and the second metal layer 16 is electrically insulated from the first metal layer 14. The first metal layer 14 includes a plurality of first mesh electrodes 141 extending along a first direction D1, and the second metal layer 16 includes a plurality of second mesh electrodes 161 extending along a second direction D2, wherein each of the first mesh electrodes 141 has a mesh pattern, and each of the second mesh electrodes 161 has another mesh pattern. The first direction D1 is different from the second direction D2. For example, the first direction D1 may be perpendicular to the second direction D2. For example, outlines of the first mesh electrode 141 and the second mesh electrode 161 may be strip-shaped or other suitable shapes, but not limited thereto. In addition, in a top view of the touch panel 1 (i.e., viewing the touch panel 1 along a top view direction TD), the first mesh electrodes 141 cross and are capacitively coupled with the second mesh electrodes 161 to form a plurality of sensing units for detecting a position of a touching object. Each of the sensing units SU may be, for example, formed by one of the first mesh electrodes 141 crossing one of the second mesh electrodes 161. For example, the first mesh electrodes 141 and the second mesh electrodes 161 are respectively driving electrodes for transmitting driving signals and sensing electrodes for receiving sensing signals in the touch panel 1, or vice versa. In order to clearly show an arrangement structure of the first mesh electrodes 141 and the second mesh electrodes 161, FIG. 1 shows the outlines of the first mesh electrodes and the second mesh electrodes and omits the mesh patterns, but the present invention is not limited thereto.

The substrate 12 may be used to carry the first metal layer 14 and the second metal layer 16. The substrate 12 may include, for example, a transparent substrate, a display panel, or other rigid substrate. The material of the transparent substrate may include, for example, a glass substrate, a plastic substrate, an acrylic substrate, a quartz substrate, a sapphire substrate or other suitable substrate materials. When the substrate 12 includes the display panel, the first metal layer 14 and the second metal layer 16 may be formed on a display surface of the display panel or in the display panel, or respectively formed inside and outside the display panel. The first metal layer 14 and the second metal layer 16 may include, for example, gold, silver, copper, aluminum, nickel, zinc, other suitable materials, or alloys or combinations thereof.

In some embodiments, as shown in FIG. 1, the touch panel 1 may optionally include a plurality of first connecting electrodes 18 and a plurality of second connecting electrodes 20, wherein the first connecting electrodes 18 may be respectively disposed on and connected to one end or both ends of each of the first mesh electrodes 141 to electrically connecting the first mesh electrodes 141 to pads or a control element, and the second connecting electrodes 20 may be respectively disposed on and connected to one end or both ends of each of the second mesh electrodes 161 for connecting the second mesh electrodes 161 to pads or the control element.

In some embodiments, the first metal layer 14 may optionally further include a plurality of first dummy electrodes extending along the first direction D1, and each of the first mesh electrodes 141 may be disposed between two adjacent first dummy electrodes. The second metal layer 16 may optionally further include a plurality of second dummy electrodes extending along the second direction D2, and each of the second mesh electrodes 161 is disposed between two adjacent second dummy electrodes. Through installation of the first dummy electrodes and the second dummy electrodes, the first metal layer 14 and the second metal layer 16 may present a uniform visual effect.

Figure 2:
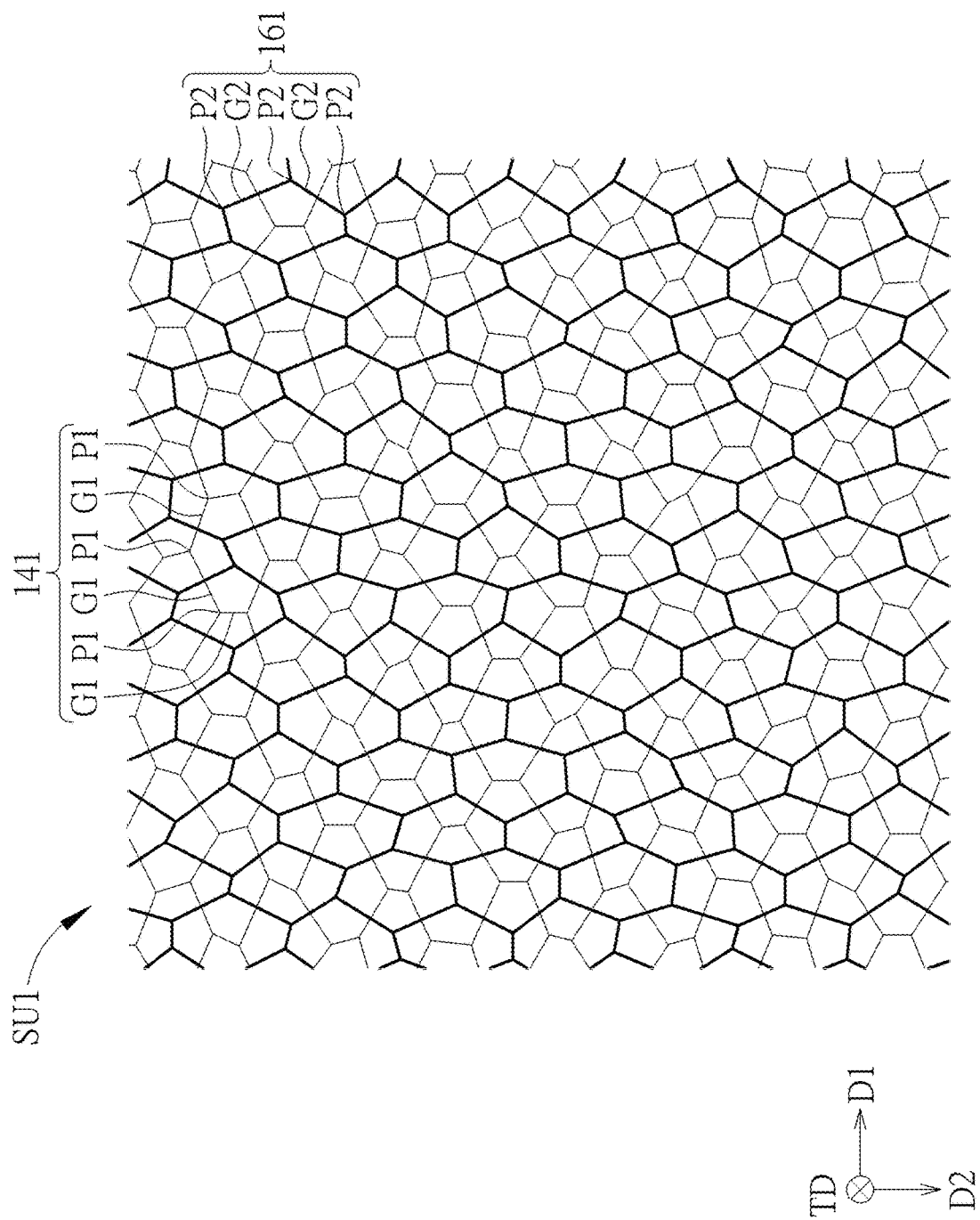
FIG. 2 schematically illustrates a top view of one of the sensing units according to the first embodiment of the present invention.
Figure 3:
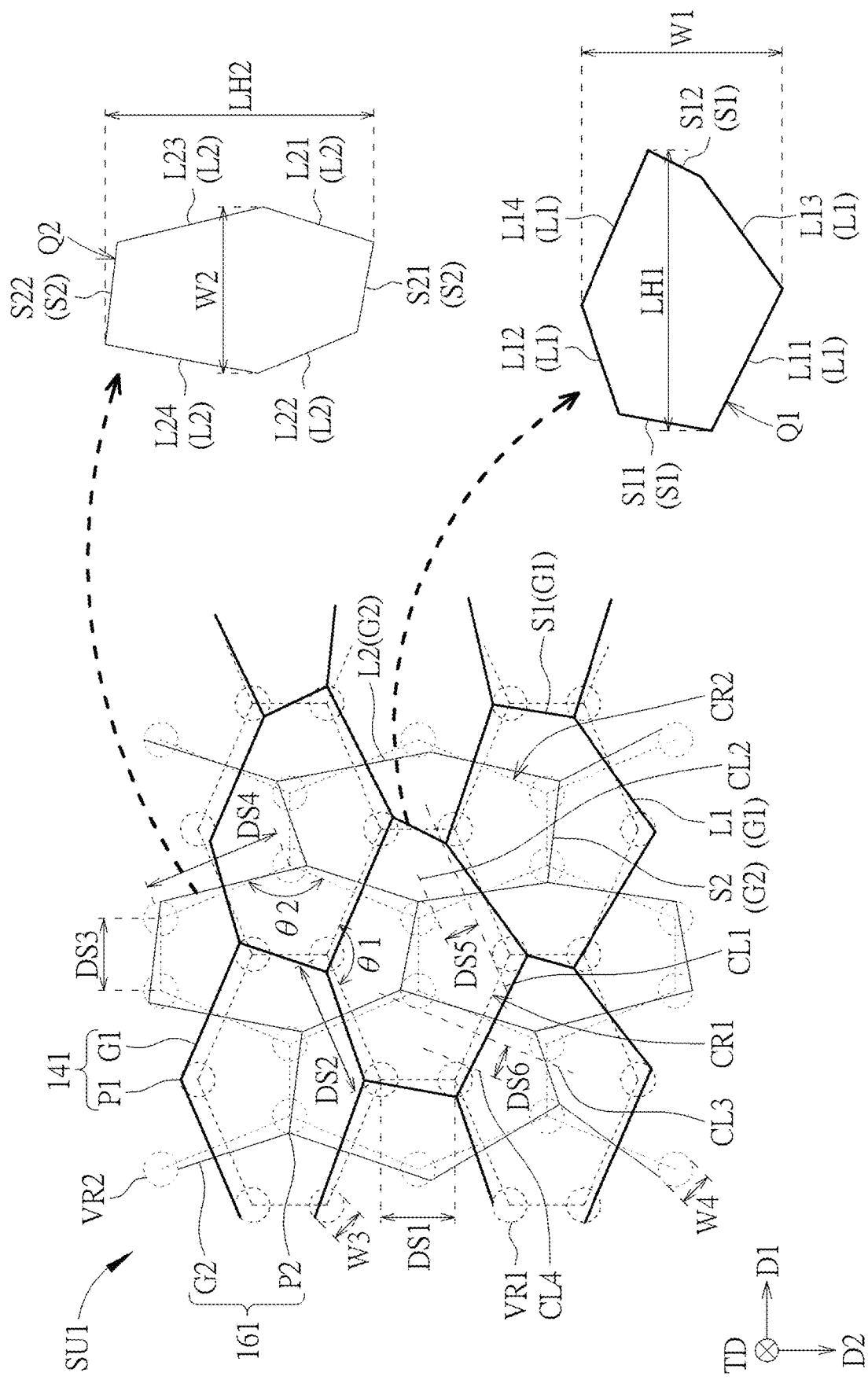
FIG. 3 schematically illustrates an enlarged top view of a part of the sensing unit according to the first embodiment of the present invention.

Refer to FIG. 2 and FIG. 3. FIG. 2 schematically illustrates a top view of one of the sensing units according to the first embodiment of the present invention, and FIG. 3 schematically illustrates an enlarged top view of a part of the sensing unit according to the first embodiment of the present invention. As shown in FIG. 2 and FIG. 3, in the sensing unit SU1, each of the first mesh electrodes 141 includes a plurality of first polygonal grids Q1 tiled to each other, so that each of the first mesh electrodes 141 has the mesh pattern. Each of the first polygonal grids Q1 has a first length LH1 in the first direction D1 and a first width W1 in the second direction D2, and the first length LH1 is greater than the first width W1. Each of the second mesh electrodes 161 includes a plurality of second polygonal grids Q2 tiled to each other, so that each of the second mesh electrodes 161 has the another mesh pattern, wherein each of the second polygonal grids Q2 has a second length LH2 in the second direction D2 and a second width W2 in the first direction D1, and the second length LH2 is greater than the second width W2. In this content, a length or width of a polygonal grid in a direction may refer to a projection length or width of the polygonal grid projected onto the direction. For example, the first length LH1 of the first polygonal grid Q1 (or the second width W2 of the second polygonal grid Q2) in the first direction D1 may refer to the projection length of the first polygonal grid Q1 (or the projection width of the second polygonal grid Q2) projected onto the first direction D1, and the first width W1 of the first polygonal grid Q1 (or the second length LH2 of the second polygonal grid Q2) in the second direction D2 may refer to the projection width of the first polygonal grid Q1 (or the projection length of the second polygonal grid Q2) in the second direction D2. Since the first polygonal grid Q1 and the second polygonal grid Q2 have longer lengths in the first direction D1 and the second direction D2 respectively, it helps to uniformize resistances of the first mesh electrodes 141 in the first direction D1 and resistances of the second mesh electrodes 161 in the second direction D2, thereby reducing the computational burden of the touch panel and/or improving touch sensitivity of the touch panel. For example, each of the first mesh electrodes 141 may include a plurality of first grid lines G1 and a plurality of first grid points P1, and the first grid lines G1 are connected by the first grid points P1 to form the first polygonal grids Q1. Each of the second mesh electrodes 161 may include a plurality of second grid lines G2 and a plurality of second grid points P2, and the second grid lines G2 are connected by the second grid points P2 to form the second polygonal grids Q2. In the drawings herein, in order to clearly distinguish the first mesh electrode 141 and the second mesh electrode 161, the grid lines of the first mesh electrode 141 and the second mesh electrode 161 are shown with different thicknesses, but this is not used to limit line widths of the grid lines. The sensing units SU1 of this embodiment may be applied to the sensing units SU of the touch panel 1 of the above embodiment or any one of touch panels mentioned in the following content.

As shown in FIG. 3, one of the first polygonal grids Q1 may include four first long sides L1 and at least one first short side S1, and the first short side S1 is connected between two of the first long sides L1. One of the second polygonal grids Q2 may include four second long sides L2 and at least one second short side S2, and the second short side S2 is connected between two of the second long sides L2. Furthermore, in the top view, one of the second polygonal grids Q2 may surround one first short side S1, and two of the second long sides L2 of the second polygonal grid Q2 may respectively cross two of the first long sides L1 of one of the first polygonal grids Q1. The first polygonal grid Q1 may surround one second short side S2 of another one of the second polygonal grids Q2 in the top view.

In the embodiment of FIG. 3, the first polygonal grids Q1 and the second polygonal grids Q2 are hexagons, wherein each of the first polygonal grids Q1 may include four first long sides L1 and two first short sides S1, and each of the second polygonal grids Q2 may include four second long sides L2 and two second short sides S2, but the present invention is not limited thereto. For example, in each of the first polygonal grids Q1, the first long sides L1 include the first long sides L11, L12, L13, and L14, and the first short sides S1 include the first short sides S11, S12. In each of the second polygonal grids Q2, the second long sides L2 include the second long sides L21, L22, L23, and L24, and the second short side S2 includes the second short sides S21 and S22. Among them, the first short side S11 may be connected between the two first long sides L11 and L12, and the first short side S12 may be connected between the other two first long sides L13 and L14. Also, the first long side L11 and the first long side L13 are connected between one end of the first short side S11 and one end of the first short side S12, and the first long side L12 and the first long side L14 are connected between the other end of the first short side S11 and the other end of the first short side S12. Therefore, in one of the first polygonal grids Q1, the first length LH1 in the first direction D1 may be greater than the first width W1 in the second direction D2. In addition, the second short side S21 may be connected between the two second long sides L21 and L22, and the second short side S22 may be connected between the other two second long sides L23 and L24. Also, the second long side L21 and the second long side L23 are connected between one end of the second short side S21 and one end of the second short side S22, and the second long side L22 and the second long side L24 are connected between the other end of the second short side S21 and the other end of the second short side S22. Therefore, in one of the second polygonal grids Q2, the second length LH2 in the second direction D2 may be greater than the second width W2 in the first direction D1.

In this embodiment, the first polygonal grids Q1 are irregular, that is, shapes of the first polygonal grids Q1 are different from each other, so that the mesh pattern of each of the first mesh electrodes 141 formed by the first polygonal grids Q1 is irregular. Also, the second polygonal grids Q2 are irregular, that is, shapes of the second polygonal grids Q2 are different from each other, so that the mesh pattern of each of the second mesh electrodes 161 formed by the second polygonal grids Q2 is irregular. The irregular shapes may be, for example, patterns that do not have periodic regularities. For example, the first lengths LH1 of the first polygonal grids Q1 of any two adjacent of the first mesh electrodes 141 or the same one of the first mesh electrodes 141 may be different, and/or their first widths W1 may be different. Moreover, the second lengths LH2 of the second polygonal grids Q2 of any two adjacent of the second mesh electrode 161 or the same one of the second mesh electrodes 161 may be different, and/or their second widths W2 may be different. Because the first mesh electrodes 141 and the second mesh electrodes 161 have irregular mesh patterns respectively, they are not easy to interfere with periodically arranged pixels in the display panel to form a moiré pattern.

The method of forming the first polygonal grids Q1 and the second polygonal grids Q2 is further described in detail below, so that the irregular mesh patterns of the first mesh electrodes 141 and the second mesh electrodes 161 may be formed of the irregular polygonal grids. As shown in FIG. 3, the substrate 12 has a plurality of first virtual regions VR1 and a plurality of second virtual regions VR2. In the top view, each of the first grid points P1 is disposed in a corresponding one of the first virtual regions VR1, and each of the second grid points P2 is disposed in a corresponding one of the second virtual regions VR2. Each of the first virtual regions VR1 may be used to limit a position of the corresponding first grid point P1, and each of the second virtual regions VR2 may be used to limit a position of the corresponding second grid point P2. In other words, although FIG. 3 shows that the first grid points P1 and the second grid points P2 are respectively disposed at edges of the first virtual regions VR1 and the second virtual regions VR2, the present invention is not limited thereto. That is to say, each of the first grid points P1 may be disposed at any point in the corresponding first virtual region VR1, and each of the second grid points P2 may be disposed at any point in the corresponding second virtual region VR2. For example, the first virtual region VR1 and/or the second virtual region VR2 may have, for example, 100×100 or 1000×1000 points or other suitable point arrays, and the point may be a point randomly selected from the point array. The shapes of the first virtual regions VR1 and the second virtual regions VR2 may be geometric shapes, in which the geometric shapes may be circular, rectangular or other suitable shapes. In FIG. 3, the shapes of the first virtual regions VR1 and the second virtual regions VR2 are circular as an example, but not limited thereto.

It should be noted that, as shown in FIG. 3, the first grid points P1 in the adjacent first virtual regions VR1 may be located at different positions in the corresponding first virtual regions VR1. For example, positions of different first grid points P1 respectively relative to center points of the corresponding first virtual regions VR1 are different. Through this design, the adjacent first polygonal grids Q1 have the irregular shapes, so as to form the irregular mesh pattern. Similarly, the second grid points P2 in the adjacent second virtual regions VR2 may be located at different positions in the corresponding second virtual regions VR2. For example, positions of different second grid points P2 respectively relative to the center points of the corresponding second virtual regions VR2 are different. Through this design, the adjacent second polygonal grids Q2 have the irregular shapes, so as to form the irregular mesh pattern.

In FIG. 3, the center points of six of the first virtual regions VR1 corresponding to one of the first polygonal grids Q1 may be connected to form a first closed region CR1, and the first closed region CR1 surrounds two of the second virtual regions VR2, so that one of the first polygonal grids Q1 may surround one of the second short sides S2 or two of the second grid points P2. Similarly, the center points of six of the second virtual regions VR2 corresponding to one of the second polygonal grids Q2 may be connected to form a second closed region CR2, and the second closed region CR2 may surround two of the first virtual regions VR1, so that one of the second polygonal grids Q2 may surround one of the first short sides S1 or two of the first grid points P1.

For example, the forming method of the first virtual regions VR1 may include providing first regions that are arranged in an array, and then moving odd-numbered and even-numbered first regions of odd rows along the second direction D2 and a direction opposite to the second direction D2 respectively to form the first virtual regions VR1 of odd rows staggered in the first direction D1 and moving odd-numbered and even-numbered first regions in even rows along the direction opposite to the second direction D2 and the second direction D2 respectively to form the first virtual regions VR1 of even rows staggered in the first direction D1. The first virtual regions VR1 of two adjacent rows formed by the first regions of two adjacent rows may be symmetrical to each other with respect to the first direction D1 for example.

Through the above forming method of the first virtual regions VR1, a distance DS1 between the center points of adjacent two of the first virtual regions VR1 of the same column (or arranged in the second direction D2) may be less than a distance DS2 between the center points of adjacent two of the first virtual regions VR1 in the first direction D1 (i.e., the first virtual regions VR1 formed by adjacent two of the first regions in the same row). In other words, one of the first grid lines G1 formed by connecting two of the first grid points P1 in adjacent two of the first virtual regions VR1 of the same column may be used as one of the first short sides S1 of the first polygonal grids Q1, such as the first short side S11, S12, and another of the first grid lines G1 formed by connecting two of the first grid points P1 in adjacent two of the first virtual regions VR1 arranged in the first direction D1 may be used as one of the first long sides L1 of the first polygonal grids Q1, such as the first long sides L11, L12, L13, L14.

In addition, the forming method of the second virtual regions VR2 may include providing second regions arranged in an array, wherein the second regions may be arranged in a staggered formation with the first regions, and then moving odd-numbered and even-numbered second regions of the odd columns along the direction opposite to the first direction D1 and the first direction D1 respectively to form the second virtual regions VR2 of each of odd columns staggered in the second direction D2 and moving the odd-numbered and even-numbered second regions of even columns respectively along the first direction D1 and the direction opposite to the first direction D1, such that the second virtual regions VR2 of each of even columns are staggered in the second direction D2. The second virtual regions VR2 of adjacent columns formed by the second regions of adjacent columns may, for example, be symmetrical to each other with respect to the second direction D2.

Through the above forming method of the second virtual regions VR2, a distance DS3 between the center points of adjacent two of the second virtual regions VR2 of the same row (or arranged in the first direction D1) is less than a distance DS4 between the center points of adjacent two of the second virtual regions VR2 arranged in the second direction D2 (i.e., the second virtual regions VR2 formed by two adjacent second regions of the same column). In other words, one of the second grid lines G2 formed by connecting two of the second grid points P2 disposed in adjacent two of the second virtual regions VR2 of the same row may be one of the second short sides S2 of the second polygonal grids Q2, such as the second short side S21 and S22, and another of the second grid lines G2 formed by connecting two of the second grid points P2 disposed in adjacent two of the second virtual regions VR2 arranged in the second direction D2 may be used as one of the second long sides L2 of the second polygonal grids Q2, such as the second long sides L21, L22, L23, and L24.

In one embodiment, the maximum widths W3 of the first virtual regions VR1 may be the same as each other, and the maximum widths W4 of the second virtual regions VR2 may be the same as each other, but not limited thereto. The maximum width W3 of the first virtual region VR1 may be the same as or different from the maximum width W4 of the second virtual region VR2. Also, the distance DS3 may be the same as or different from the distance DS1, for example. The distance DS4 may be the same as or different from the distance DS2, for example. In some embodiments, a ratio of the maximum width W3 to the distance DS2 and/or a ratio of the maximum width W4 to the distance DS4 may, for example, range from 5% to 358. The distance DS2 and/or the distance DS4 may be greater than 200 micrometers (μm) and less than 1000 μm.

As shown in FIG. 3, the maximum width W3 of each of the first virtual regions VR1 may be greater than 0 and less than the distance DS1 between the center points of two of the first virtual regions VR1 corresponding to the first short side S1 of one of the first polygonal grids Q1. In other words, two adjacent first virtual regions VR1 of the same column (or arranged in the second direction D2) may be separated from each other, but not limited thereto. Similarly, the maximum width W4 of each of the second virtual regions VR2 may be greater than 0 and less than the distance DS3 between the center points of two of the second virtual regions VR2 corresponding to the second short side S2 of one of the second polygonal grids Q2. In other words, two adjacent second virtual regions VR2 of the same row (or arranged in the first direction D1) may be separated from each other, but not limited thereto.

Since two of the first virtual regions VR1 corresponding to the first short side S1 of one of the first polygonal grids Q1 are separated from each other, and adjacent two of the first virtual regions VR1 arranged in the first direction D1 are staggered, the center points of three of the first virtual regions VR1 corresponding to two of the first long sides L1 connected to each other may be connected to form two first straight lines L1 corresponding to two of the first long sides L1, and an angle θ1 between the first straight lines may be greater than 90 degrees and less than 180 degrees. Similarly, since two of the second virtual regions VR2 corresponding to the second short side S2 of one of the second polygonal grids Q2 are separated from each other, and adjacent two of the second virtual regions VR2 arranged in the second direction D2 are staggered, the center] points of three of the second virtual regions VR2 corresponding to two of the second long sides L2 connected to each other may be connected to form two second straight lines corresponding to two of the second long sides L2, and an angle θ2 between the second straight lines may be greater than 90 degrees and less than 180 degrees.

In the embodiment of FIG. 3, two of the first virtual regions VR1 corresponding to the first long side L1 may have the same first tangent line CL1 adjacent to the two of the second virtual regions VR2 surrounded by the first closed region CR1, and the one of the second virtual regions VR2 adjacent to the first tangent line CL1 may have a second tangent CL2 parallel and adjacent to the first tangent line CL1, wherein a distance is between the second tangent line CL2 and the first tangent line CL1. Accordingly, the second grid points P2 disposed in the second virtual regions VR2 may not overlap the first grid lines G1, which mitigates uneven coupling capacitances of the sensing units SU1. Similarly, two of the second virtual regions VR2 corresponding to the second long side L2 may have the same third tangent line CL3 adjacent to the two of the first virtual regions VR1 surrounded by the second closed region CR2, and the one of the first virtual regions VR1 adjacent to the third tangent line CL3 may have a fourth tangent CL4 parallel and adjacent to the third tangent CL3, wherein a distance DS6 is between the fourth tangent CL4 and the third tangent CL3. Accordingly, the first grid points P1 disposed in the first virtual regions VR1 may not overlap the second grid lines G2. The distance DS5 and/or the distance DS6 may be, for example, greater than 10 μm.

Figure 4:
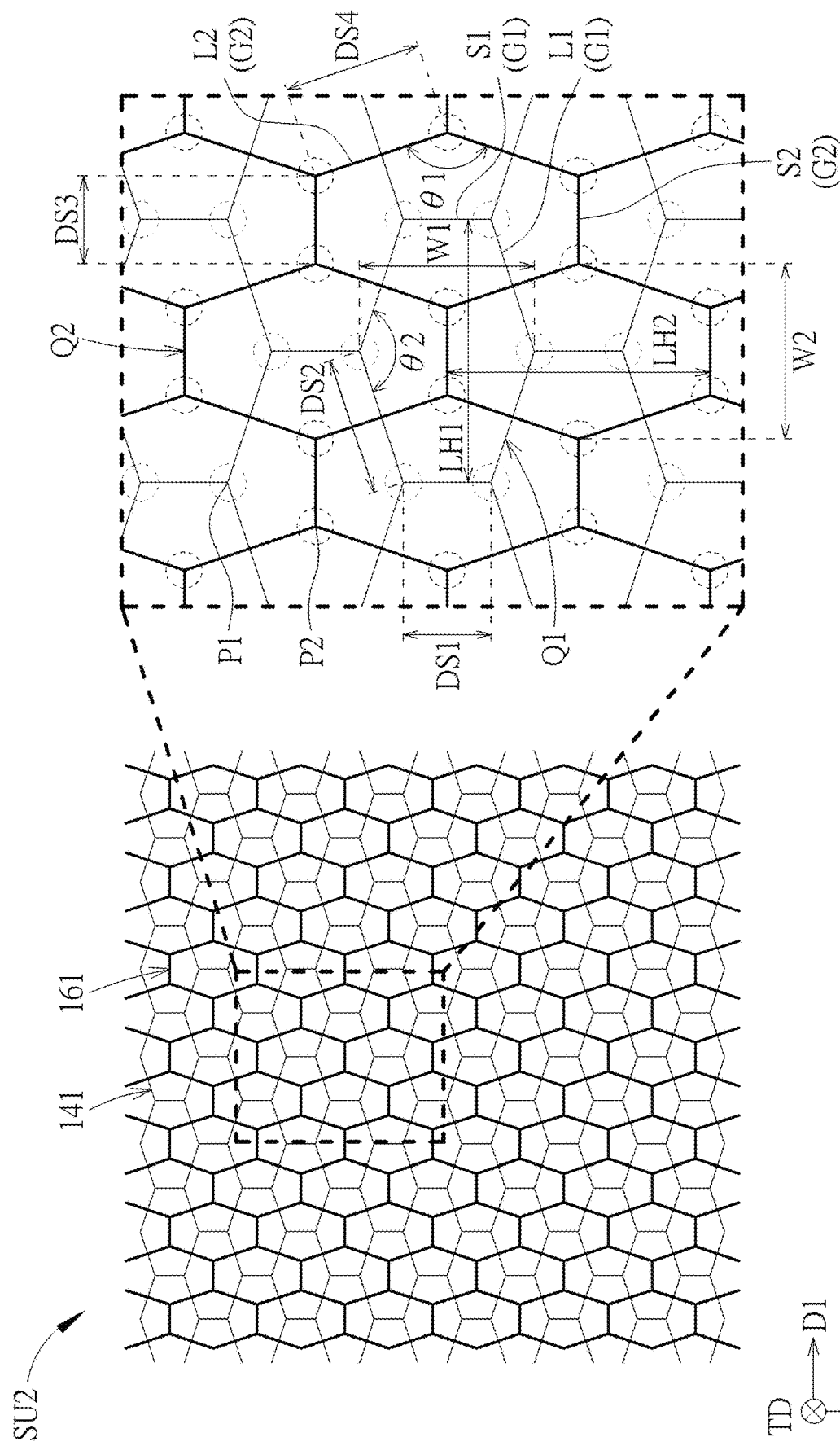
FIG. 4 schematically illustrates a top view of a sensing unit according to a second embodiment of the present invention.

Refer to FIG. 4, which schematically illustrates a top view of a sensing unit according to a second embodiment of the present invention. As shown in FIG. 4, the sensing unit SU2 provided in this embodiment differs from the sensing unit SU1 of FIG. 3 in that the first polygonal grids Q1 and the second polygonal grids Q2 of this embodiment have the same hexagonal shape, so that the first mesh electrodes 141 and the second mesh electrodes 161 have the regular mesh patterns, respectively. The first polygonal grids Q1 may be extended along the first direction D1, while the second polygonal grid Q2 may be extended along the second direction D2. In the embodiment of FIG. 4, the first grid points P1 may be respectively disposed at the center points of the first virtual regions VR1, and the second grid points P2 may be respectively disposed at the center points of the second virtual regions VR2, so that the first polygonal grids Q1 and the second polygonal grids Q2 are hexagons the same as each other, but not limited thereto. For example, the first lengths LH1 of any two adjacent first polygonal grids Q1 may be the same as each other, and their first widths W1 may be the same as each other. Also, the second lengths LH2 of any two adjacent second polygonal grids Q2 may be the same as each other, and their second widths W2 may be the same as each other. Since other parts of the sensing unit SU2 of this embodiment may be the same as the sensing unit SU1 of FIG. 3, they are not repeated herein. The sensing unit SU2 of this embodiment may be applied to the sensing unit SU of the touch panel 1 of the above embodiment or to any one of touch panels mentioned in the following content.

Figure 5:
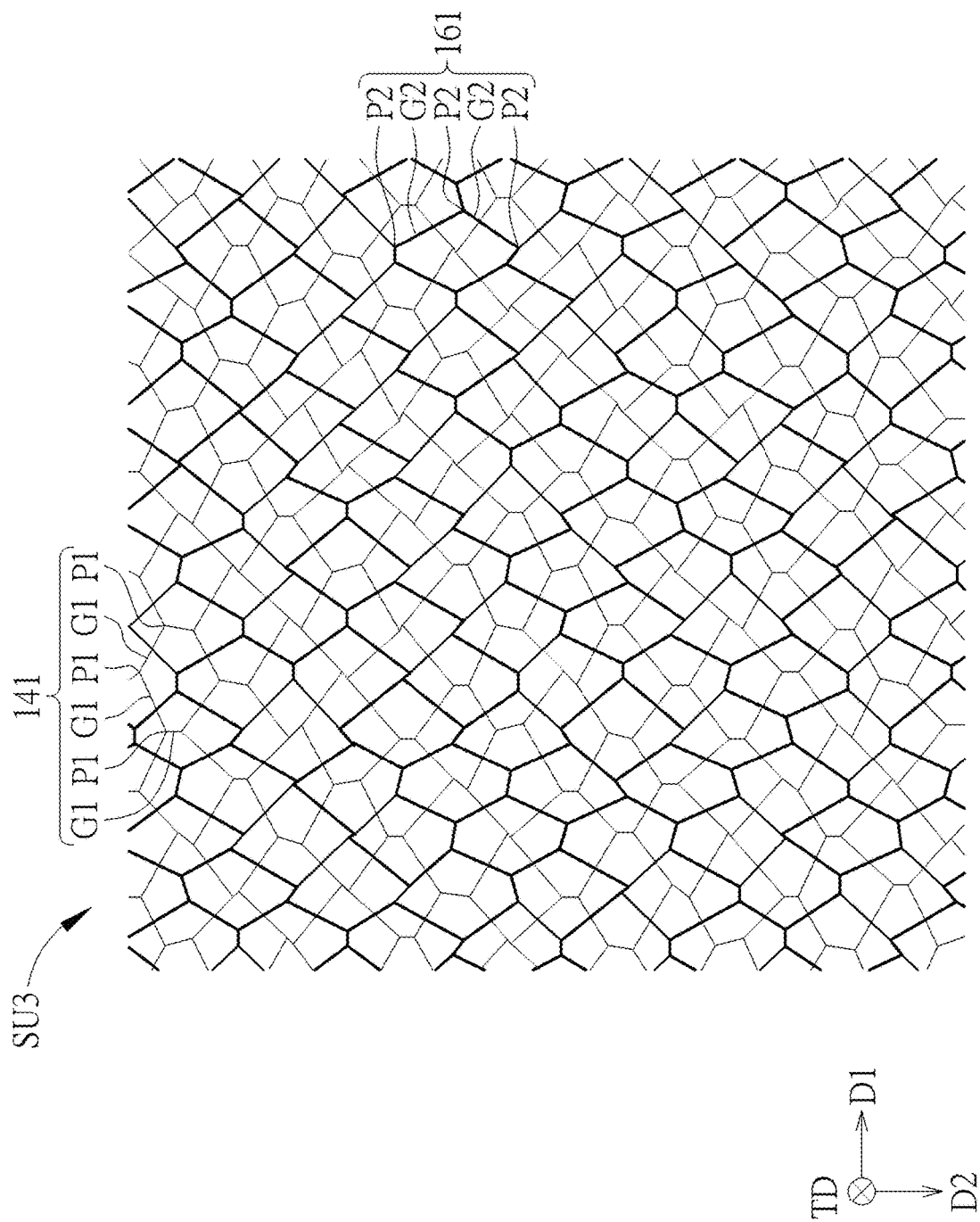
FIG. 5 schematically illustrates a top view of a sensing unit of a touch panel according to a third embodiment of the present invention.
Figure 6:
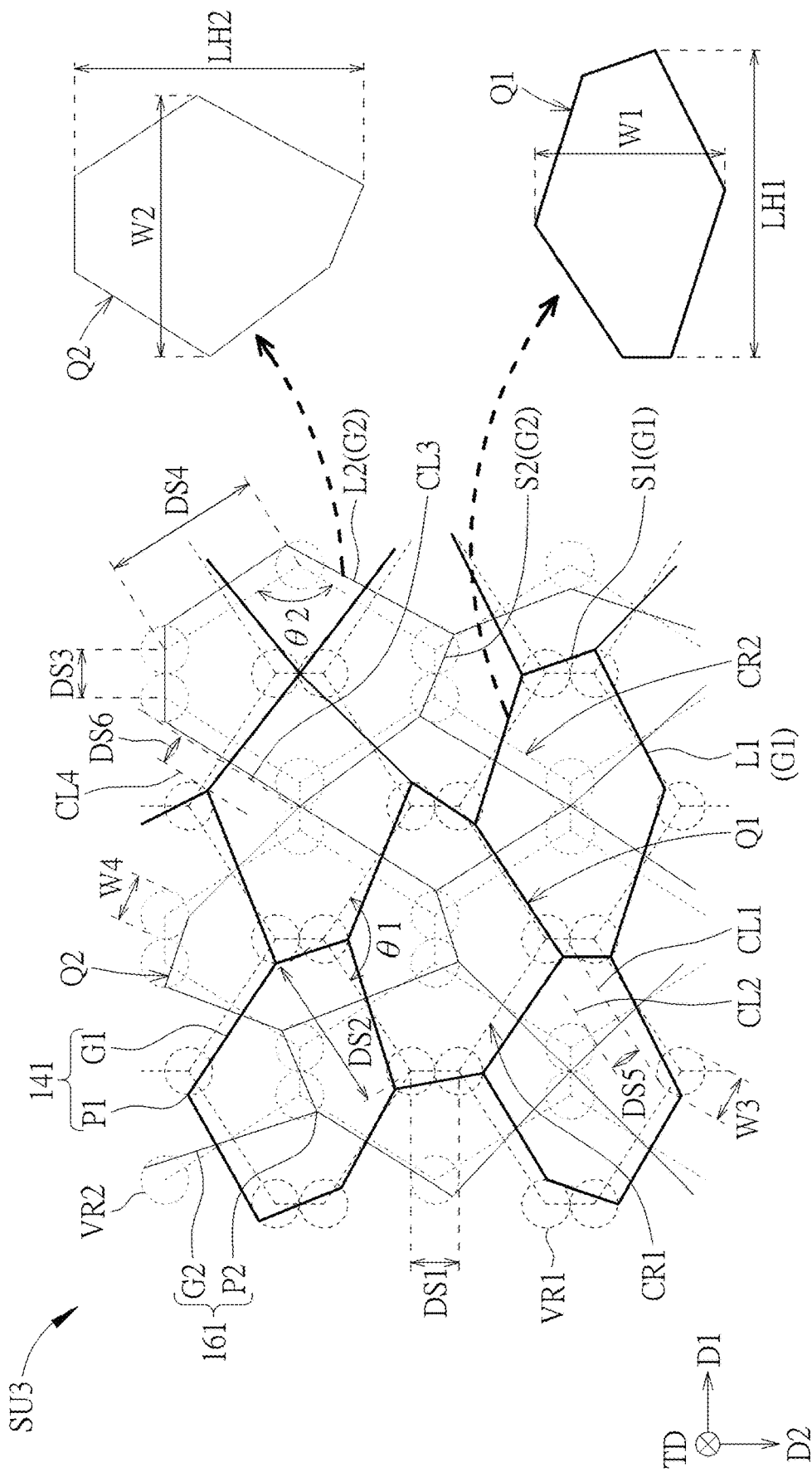
FIG. 6 schematically illustrates an enlarged top view of a part of the sensing unit according to the third embodiment of the present invention.

Refer to FIG. 5 and FIG. 6. FIG. 5 schematically illustrates a top view of a sensing unit of a touch panel according to a third embodiment of the present invention, and FIG. 6 schematically illustrates an enlarged top view of a part of the sensing unit according to the third embodiment of the present invention. As shown in FIG. 5 and FIG. 6, the sensing unit SU3 provided in this embodiment differs from the sensing unit SU1 of FIG. 3 in that at least one first polygonal grid Q1 and/or at least one second polygonal grid Q2 may be a quadrilateral or a pentagon, so as to enhance irregularity of the first mesh electrodes 141 and the second mesh electrodes 161. In this case, at least another of the first polygonal grids Q1 and/or at least another of the second polygonal grids Q2 may be a hexagon. When the first polygonal grid Q1 is the pentagon, the first polygonal grid Q1 may include four first long sides L1 and a first short side S1, and similarly when the second polygonal grid Q2 is the pentagon, the second polygonal grid Q2 may include four second long sides L2 and a second short side S2. When the first polygonal grid Q1 is the quadrilateral, the first polygonal grid Q1 may include four first long sides L1, and similarly when the second polygonal grid Q2 is the quadrilateral, the second polygonal grid Q2 may include four second long sides L2. In this embodiment, the first lengths LH1 of the first polygonal grids Q1 of any two adjacent first mesh electrodes 141 or the same first mesh electrode 141 may be different, and/or their first widths W1 may be different. Moreover, the second lengths LH2 of the second polygonal grids Q2 of any two adjacent second mesh electrodes 161 or the same second mesh electrode 161 may be different, and/or their second widths W2 may be different. In some embodiments, at least three first polygonal grids Q1 may be respectively the quadrilateral, the pentagon, and the hexagon, but not limited thereto.

In the embodiment of FIG. 6, the maximum width W3 of each of the first virtual regions VR1 may be equal to the distance DS1 between the center points of two of the first virtual regions VR1 corresponding to one of the first short sides S1 of the first polygonal grid Q1, and the maximum width W4 of each of the second virtual regions VR2 may be equal to the distance DS3 between the center points of two of the second virtual regions VR2 corresponding to one of the second short sides S2 of the second polygonal grid Q2. In other words, edges of adjacent two of the first virtual regions VR1 of the same column (or arranged in the second direction D2) may be tangent to each other, and edges of adjacent two of the second virtual regions VR2 of the same row (or arranged in the first direction D1) may be tangent to each other. One of the first grid points P1 may be disposed as any point in one of the first virtual regions VR1, and one of the second grid points P2 may be disposed as any point in one of the second virtual regions VR2. Since the edges of the two adjacent second virtual regions VR2 are tangent to each other, the first grid points P1 respectively in the two adjacent first virtual regions VR1 of the same column may be different points, or may be located at the edges of the first virtual regions VR1 tangent to each other at the same time so as to be regarded as one of the first grid points P1. When the number of first grid points P1 located at the edges of the first virtual regions VR1 is one, the first polygonal grid Q1 formed by the first grid points P1 may be the pentagon. When the number of the first grid points P1 is two, the first polygonal grid Q1 may be the quadrilateral. Similarly, when the number of second grid points P2 at the edges of the second virtual regions VR2 is one or two, the second polygonal grid Q2 formed by the second grid points P2 may be the pentagon or the quadrilateral. Since other parts of the sensing unit SU3 of this embodiment may be the same as the sensing unit SU1 of FIG. 3, they are not repeated herein. The sensing unit SU3 of this embodiment may be applied to the sensing unit SU of the touch panel 1 of the above embodiment or to any one of touch panels in the following content.

Figure 7:
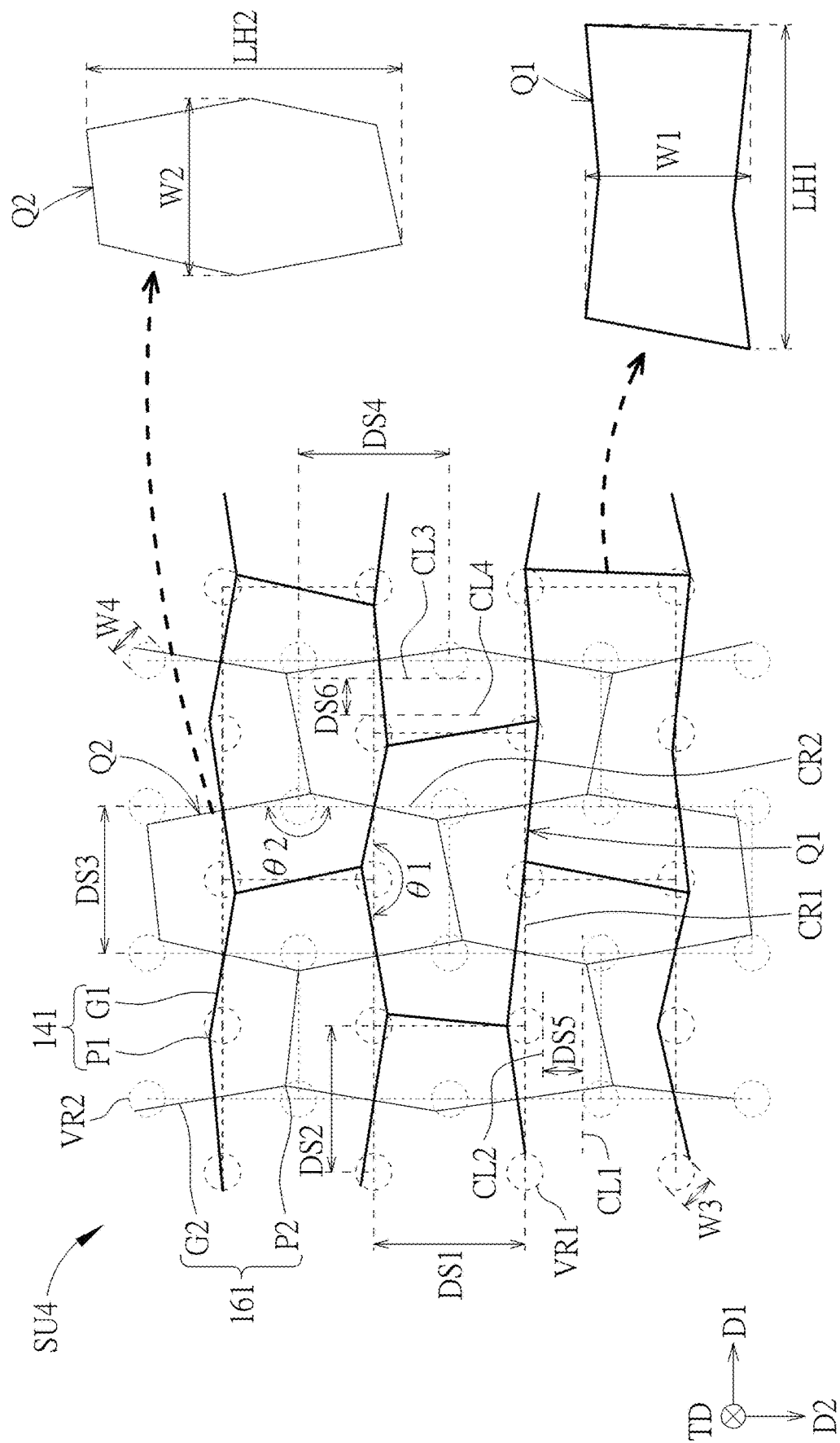
FIG. 7 schematically illustrates a top view of a part of a sensing unit of a touch panel according to a fourth embodiment of the present invention.

Refer to FIG. 7. FIG. 7 schematically illustrates a top view of a part of a sensing unit of a touch panel according to a fourth embodiment of the present invention. As shown in FIG. 7, the sensing unit SU4 provided in this embodiment differs from the sensing unit SU1 of FIG. 3 in that at least one of the first polygonal grids Q1 and/or at least one of the second polygonal grids Q2 may be a concave hexagon. The first length LH1 of one of the first polygonal grids Q1 in the first direction D1 may still be greater than the first width W1 of the first polygonal grid Q1 in the second direction D2, and the second length LH2 of one of the second polygonal grids Q2 in the second direction D2 may still be greater than the second width W2 of the second polygonal grid Q2 in the first direction D1, thereby uniformizing the resistances of the first mesh electrodes 141 disposed along the first direction D1 and the resistances of the second mesh electrodes 161 disposed along the second direction D2.

In this embodiment, the first virtual regions VR1 may be arranged in an array, and the second virtual regions VR2 may be arranged in the same array, in which the first virtual regions VR1 and the second virtual regions VR2 may arranged in a staggered formation. In this case, the center points of any two adjacent first virtual regions VR1 of three adjacent first virtual regions of the same row may be connected into the first straight line, and the angle θ1 between two first straight lines may be equal to 180 degrees. Similarly, the angle θ2 between the second straight lines connected by the center points of the three second virtual regions VR2 of the same column is equal to 180 degrees.

Specifically, the first polygonal grids Q1 and the second polygonal grids Q2 may be irregular first hexagons and irregular second hexagons, respectively. In the top view, one of the second hexagons may surround one side of one of the first hexagons, and two sides of the one of the second hexagons may cross other two sides of the one of the first hexagons connected the side, respectively. Also, the first hexagon may surround one side of another of the second hexagons in the top view. For example, the first lengths LH1 of the first hexagons of any two adjacent first mesh electrodes 141 or the same first mesh electrode 141 may be different, and/or their first widths W1 may be different. Furthermore, the second lengths LH2 of the second hexagons of any two adjacent second mesh electrodes 161 or the same second mesh electrode 161 may be different, and/or their second widths W2 may be different. In this embodiment, the short side of the first hexagon is not limited to being formed by two adjacent first virtual regions VR1 of the same column, and the short side of the second hexagon is not limited to being formed by two adjacent second virtual regions VR2 of the same row. Since other parts of the sensing unit SU4 of this embodiment may be the same as the sensing unit SU1 of FIG. 3, they are not repeated here. The sensing unit SU4 of this embodiment may be applied to the sensing unit SU of the touch panel 1 of the above embodiment or to any one of touch panels in the following content.

Figure 8:
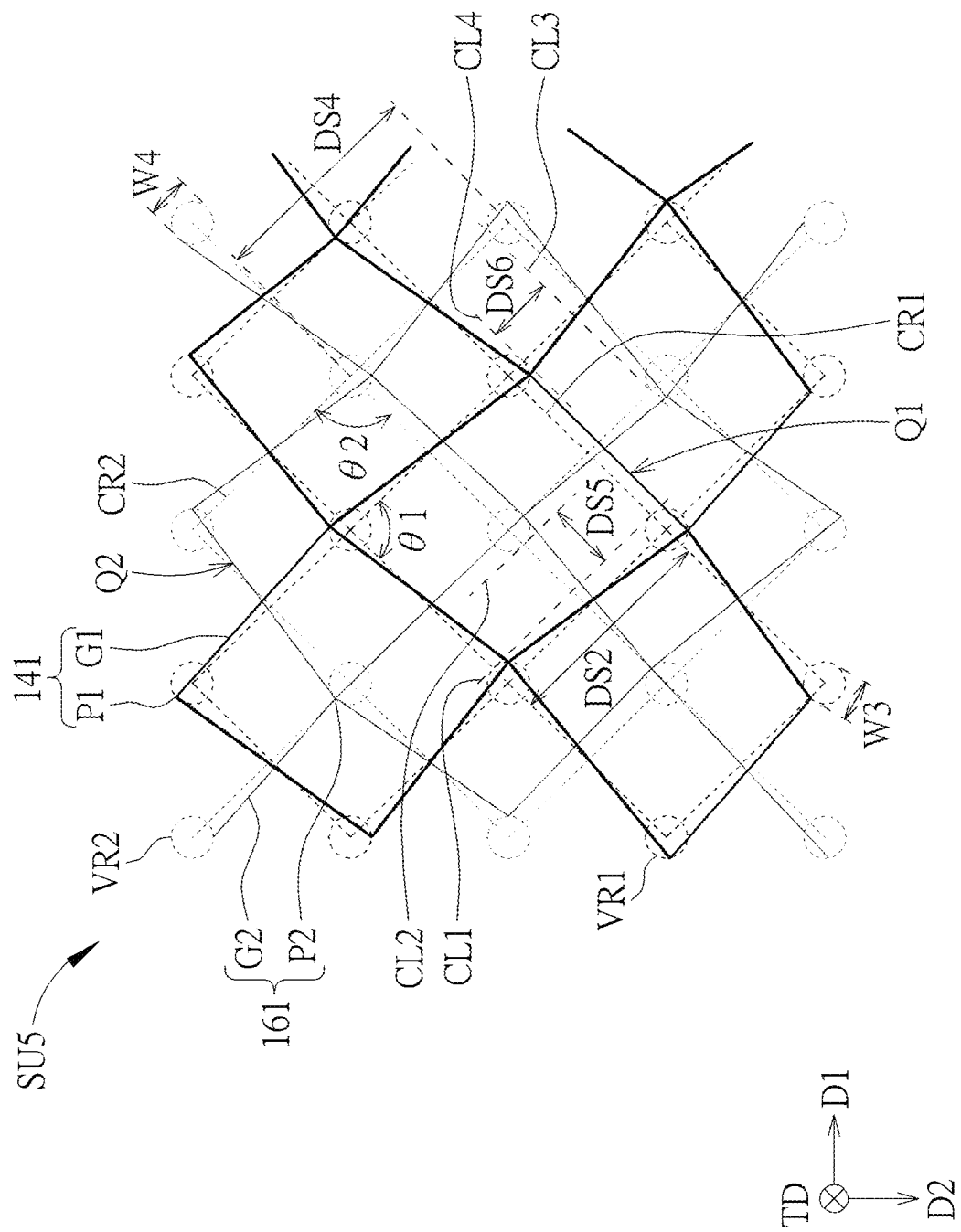
FIG. 8 schematically illustrates a top view of a part of a sensing unit of a touch panel according to a fifth embodiment of the present invention.

Refer to FIG. 8, which schematically illustrates a top view of a part of a sensing unit of a touch panel according to a fifth embodiment of the present invention. As shown in FIG. 8, the sensing unit SU5 provided in this embodiment differs from the sensing unit SU1 of FIG. 3 in that the first polygonal grids Q1 and the second polygonal grids Q2 are quadrilateral grids, wherein the first grid lines G1 are connected by the first grid points P1 to form a plurality of irregular first quadrilateral grids, and the second grid lines G2 are connected by the second grid points P2 to form a plurality of second quadrilateral grids.

In this embodiment, the first virtual regions VR1 and the second virtual regions VR2 may be arranged in an array and separated from each other, wherein the first virtual regions VR1 and the second virtual regions VR2 are arranged in a staggered formation. In other words, two adjacent first virtual regions VR1 of the same column (or arranged in the second direction D2) in FIG. 3 may be moved to coincide with each other to form the same first virtual region VR1, and two adjacent second virtual regions VR2 of the same row (or arranged in the first direction D1) may be moved to coincide with each other to form the same second virtual region VR2, so that the first virtual regions VR1 and the second virtual regions VR2 of the same column of the array are arranged alternately in sequence, and the first virtual regions VR1 and the second virtual regions VR2 of the same row of the array are also arranged alternately in sequence.

That is to say, the first virtual regions VR1 and the second virtual regions VR2 in this embodiment are arranged in the case that the distance DS1 and the distance DS3 of FIG. 3 are zero. For example, the center points in three adjacent first virtual regions VR1 corresponding to two first sides of one of the first polygonal grids Q1 connected to each other (i.e., corresponding to two first grid lines G1 connected to each other) may be connected into two first straight lines, and the angle θ1 between the first straight lines may be equal to 90 degrees. Similarly, the angle θ2 between two second straight lines formed by connecting the center points of three second virtual regions VR2 corresponding to two second sides of one of the second polygonal grids Q2 connected to each other (i.e., corresponding to two second grid lines G2 connected to each other) is equal to 90 degrees.

By randomly installing each of the first grid points P1 in the corresponding first virtual region VR1 and randomly installing each of the second grid points P2 in the corresponding second virtual region VR2, the first quadrilateral grids and the second quadrilateral grids that cross each other and are irregular may be formed. Since adjacent first quadrilateral grids may have different shapes, the first grid points P1 disposed in the first virtual regions VR1 of the same column may not be arranged on the same straight line, and the first grid points P1 disposed in the first virtual regions VR1 of the same row may not be arranged on the same straight line. Similarly, since adjacent second quadrilateral meshes can have different shapes, the second grid points P2 disposed in the second virtual regions VR2 of the same column may not be arranged on the same straight line, and the second grid points P2 disposed in the second virtual regions VR2 of the same row may not be arranged on the same straight line. Since other parts of the sensing unit SU5 of this embodiment may be the same as the sensing unit SU1 of FIG. 3, they are not repeated here. The sensing unit SU5 of this embodiment may be applied to the sensing unit SU of the touch panel 1 of the above embodiment or to any touch panels mentioned in the following content.

Figure 9:
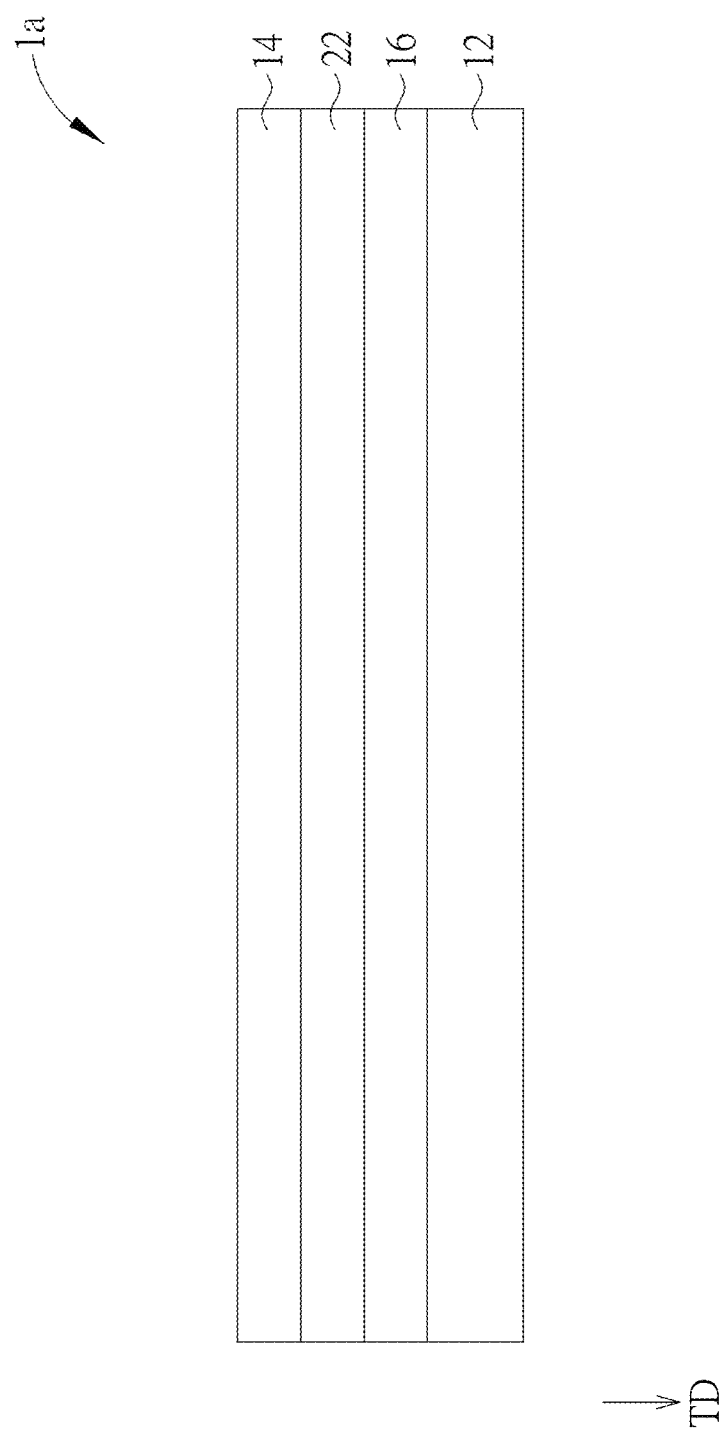
FIG. 9 and FIG. 10 respectively schematically illustrate cross-sectional views of touch panels according to some embodiments of the present invention.
Figure 10:
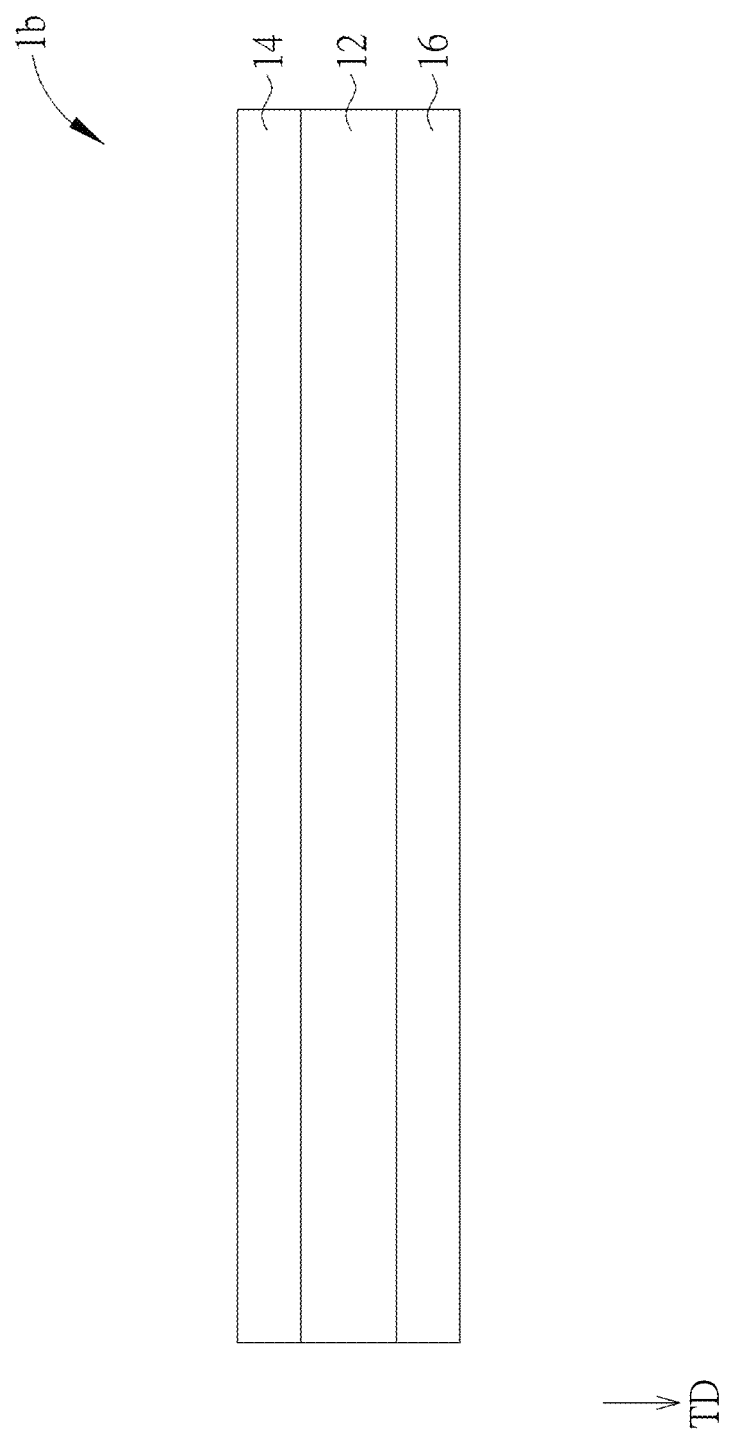

Refer to FIG. 9 and FIG. 10. FIG. 9 and FIG. 10 respectively schematically illustrate cross-sectional views of touch panels according to some embodiments of the present invention. As shown in FIG. 9, in a touch panel 1a of some embodiments, the first metal layer 14 and the second metal layer 16 may be disposed on the same side of the substrate 12, and the touch panel 1a may further include an insulating layer 22 disposed between the first metal layer 14 and the second metal layer 16 to electrically insulate the first metal layer 14 and the second metal layer 16. The order of disposing the first metal layer 14 and the second metal layer 16 on the substrate 12 of the present invention is not limited to FIG. 9, and the positions of the first metal layer 14 and the second metal layer 16 may be interchangeable with each other. A stacking structure of the touch panel of the present invention is not limited thereto. As shown in FIG. 10, in the touch panel 1b of other some embodiments, the first metal layer 14 and the second metal layer 16 may be respectively disposed on two opposite sides of the substrate 12, so that the substrate 12 may be used to electrically insulate the first metal layer 14 from the second metal layer 16. In some embodiments, the first metal layer 14 and the second metal layer 16 may be formed on different substrates respectively and then attached to each other by adhesive, but not limited thereto.

In summary, in the touch panel of the present invention, since one of the second polygonal grids surrounds one of the first short sides in the top view, and one of the first polygonal grids surrounds one of the second short sides of another of the second polygonal grids in the top view, the length of the first polygonal grid in the first direction may be greater than the width of the first polygonal grid in the second direction, and the length of the second polygonal grid in the second direction may be greater than the width of the second polygonal grid in the first direction, which helps to uniformize the resistances of the first mesh electrodes in the first direction and the resistances of the second mesh electrodes in the second direction, thereby reducing the computational burden of the touch panel and/or improving the touch sensitivity of the touch panel. In addition, because the first mesh electrodes and the second mesh electrodes have irregular mesh patterns that are not periodic, moiré patterns caused by the first mesh electrodes and the second electrodes interfering with periodically arranged pixels in the display panel may also be mitigated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate;
   a first metal layer disposed on the substrate, and the first metal layer comprising a plurality of first mesh electrodes respectively extending along a first direction, wherein each of the first mesh electrodes comprises a plurality of first polygonal grids tiled to each other, and each of the first mesh electrodes has a mesh pattern, wherein each of the first polygonal grids has a first length in the first direction and a first width in a second direction different from the first direction, and the first length is greater than the first width; and
   a second metal layer disposed on the substrate and electrically insulated from the first metal layer, and the second metal layer comprising a plurality of second mesh electrodes respectively extending along the second direction, wherein the first mesh electrodes cross the second mesh electrodes in a top view of the touch panel, each of the second mesh electrodes comprises a plurality of second polygonal grids tiled to each other, and each of the second mesh electrodes has another mesh pattern, wherein each of the second polygonal grids has a second length in the second direction and a second width in the first direction, and the second length is greater than the second width.

2. The touch panel as claimed in claim 1, wherein the first polygonal grids are irregular, and the mesh pattern is irregular, wherein the second polygonal grids are irregular, and the another mesh pattern is irregular.

3. The touch panel as claimed in claim 1, wherein each of the first polygonal grids and each of the second polygonal grids are hexagons.

4. The touch panel as claimed in claim 1, wherein at least one of the second polygonal grids or at least one of the first polygonal grids is a quadrilateral or a pentagon.

5. The touch panel as claimed in claim 1, wherein one of the first polygonal grids comprises four first long sides and at least one first short side, and the at least one first short side is connected between two of the first long sides, wherein each of two of the second polygonal grids comprises four second long sides and at least one second short side, and the at least one second short side is connected between two of the second long sides.

6. The touch panel as claimed in claim 5, wherein one of the two of the second polygonal grids surrounds the at least one first short side in the top view of the touch panel, the two of the second long sides of the one of the two of the second polygonal grids respectively cross two of the first long sides of the one of the first polygonal grids, and the one of the first polygonal grids surrounds the at least one second short side of another one of the two of the second polygonal grids.

7. The touch panel as claimed in claim 1, wherein each of the first mesh electrodes comprises a plurality of first grid lines and a plurality of first grid points, the first grid lines are connected by the first grid points to form the first polygonal grids, each of the second mesh electrodes comprises a plurality of second grid lines and a plurality of second grid points, and the second grid lines are connected by the second grid points to form the second polygonal grids.

8. The touch panel as claimed in claim 7, wherein the substrate has a plurality of first virtual regions and a plurality of second virtual regions, and in the top view of the touch panel, each of the first grid points is disposed in a corresponding one of the first virtual regions, and each of the second grid points is disposed in a corresponding one of the second virtual regions, wherein center points of six of the first virtual regions corresponding to one of the first polygonal grids are connected to form a first enclosed region, the first enclosed region surrounds two of the second virtual regions, center points of six of the second virtual regions corresponding to one of the second polygonal grids are connected to form a second enclosed region, and the second enclosed region surrounds two of the first virtual regions.

9. The touch panel as claimed in claim 8, wherein one of the first polygonal grids comprises two first long sides connected to each other, and one of the second polygonal grids comprises two second long sides connected to each other, wherein center points of three of the first virtual regions corresponding to the first long sides are connected to form two first straight lines corresponding to the first long sides, an angle between the first straight lines is greater than 90 degrees and less than or equal to 180 degrees, center points of three of the second virtual regions corresponding to the second long sides are connected to form two second straight lines corresponding to the second long sides, and another angle between the second straight lines is greater than 90 degrees and less than or equal to 180 degrees.

10. The touch panel as claimed in claim 8, wherein one of the first polygonal grids comprises two first long sides connected to each other, one of the second polygonal grids comprises two second long sides connected to each other, and each of the first virtual regions and each of the second virtual regions are circular, wherein another two of the first virtual regions corresponding to one of the first long sides have a first tangent line adjacent to the two of the second virtual regions, one of the two of the second virtual regions is adjacent to the another two of the first virtual regions and has a second tangent line adjacent to and parallel to the first tangent line, and a distance between the first tangent line and the second tangent line is greater than 10 micrometers.

11. The touch panel as claimed in claim 8, wherein one of the first polygonal grids comprises at least one first short side, and one of the second polygonal grids comprises at least one second short side, wherein a maximum width of each of the first virtual regions is greater than 0 and less than or equal to a distance between center points of two of the first virtual regions corresponding to the at least one first short side, and a maximum width of each of the second virtual regions is greater than 0 and less than or equal to a distance between center points of two of the second virtual regions corresponding to the at least one second short side.

12. The touch panel as claimed in claim 1, wherein at least one of the first polygonal grids and at least one of the second polygonal grids are concave hexagons.

13. A touch panel, comprising:
- a substrate having a plurality of first virtual regions and a plurality of second virtual regions, wherein the first virtual regions and the second virtual regions are arranged in an array and separated from each other, and the first virtual regions and the second virtual regions are arranged in a staggered formation;
- a first metal layer disposed on the substrate, and the first metal layer comprising a plurality of first mesh electrodes respectively extending along a first direction, wherein each of the first mesh electrodes comprises a plurality of first grid lines and a plurality of first grid points, the first grid lines are connected by the first grid points to form a plurality of first quadrilateral grids, and each of the first mesh electrodes has an irregular mesh pattern, wherein in a top view of the touch panel, each of the first grid points is disposed in a corresponding one of the first virtual regions; and
- a second metal layer disposed on the substrate and electrically insulated from the first metal layer, and the second metal layer comprising a plurality of second mesh electrodes respectively extending along a second direction, wherein the first mesh electrodes cross the second mesh electrodes in the top view of the touch panel, each of the second mesh electrodes comprises a plurality of second grid lines and a plurality of second grid points, the second grid lines are connected by the second grid points to form a plurality of second quadrilateral grids, and each of the second mesh electrodes has another irregular mesh pattern, wherein in the top view of the touch panel, each of the second grid points is disposed in a corresponding one of the second virtual regions.

14. The touch panel as claimed in claim 13, wherein one of the first quadrilateral grids comprises two first sides connected to each other, and one of the second quadrilateral grids comprises two second sides connected to each other, wherein center points of three of the first virtual regions corresponding to the first sides are connected to form two first straight lines corresponding to the first sides, an angle between the first straight lines is equal to 90 degrees, center points of three of the second virtual regions corresponding to the second sides are connected to form two second straight lines corresponding to the second sides, another angle between the second straight lines is equal to 90 degrees.

* * * * *